(12) United States Patent
Yoshimura et al.

(10) Patent No.: US 11,117,465 B2
(45) Date of Patent: Sep. 14, 2021

(54) VEHICLE DRIVING-FORCE DISTRIBUTING DEVICE

(71) Applicant: TOYOTA JIDOSHA KABUSHIKI KAISHA, Toyota (JP)

(72) Inventors: Takahiro Yoshimura, Toyota (JP); Masaya Michishita, Okazaki (JP); Ryota Horie, Nagoya (JP); Masayuki Hashimoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 474 days.

(21) Appl. No.: 16/137,846

(22) Filed: Sep. 21, 2018

(65) Prior Publication Data

US 2019/0092166 A1 Mar. 28, 2019

(30) Foreign Application Priority Data

Sep. 25, 2017 (JP) .............................. JP2017-184221

(51) Int. Cl.
*B60K 17/346* (2006.01)
*B60K 17/16* (2006.01)
(Continued)

(52) U.S. Cl.
CPC .......... *B60K 17/3462* (2013.01); *B60K 17/02* (2013.01); *B60K 17/165* (2013.01);
(Continued)

(58) Field of Classification Search
CPC .. B60K 17/3462; B60K 17/344; B60K 17/02; B60K 17/165; B60K 23/0808;
(Continued)

(56) References Cited

U.S. PATENT DOCUMENTS

| 9,573,464 B2 * | 2/2017 | Yoshimura ............. B60K 17/35 |
| 2011/0082004 A1 * | 4/2011 | Kato ..................... B60K 17/344 |
| | | 475/303 |

(Continued)

FOREIGN PATENT DOCUMENTS

| CN | 105501058 A | 4/2016 |
| JP | 2016-074370 A | 5/2016 |

(Continued)

*Primary Examiner* — Justin Holmes
(74) *Attorney, Agent, or Firm* — Oliff PLC

(57) ABSTRACT

A vehicle driving-force distributing device includes: first connecting/disconnecting teeth disposed on the inner circumferential side of the ring gear; a connecting/disconnecting mechanism that includes a cylindrical member and a connecting/disconnecting sleeve including second connecting/disconnecting teeth and spline-fitted movably in the rotation axis direction and relatively non-rotatably to the outer circumferential side of the shaft insertion portion and that connects and disconnects a power transmission path between the ring gear and the differential case by moving the connecting/disconnecting sleeve in the rotation axis direction between a meshing position at which the second connecting/disconnecting teeth are meshed with the first connecting/disconnecting teeth and a non-meshing position at which the second connecting/disconnecting teeth are not meshed with the first connecting/disconnecting teeth; and a synchronizing mechanism disposed between the ring gear and the cylindrical member and reducing a relative rotation between the first connecting/disconnecting teeth and the second connecting/disconnecting teeth.

12 Claims, 4 Drawing Sheets

(51) Int. Cl.
*F16H 48/08* (2006.01)
*B60K 23/08* (2006.01)
*B60K 17/344* (2006.01)
*B60K 17/02* (2006.01)
*F16H 48/20* (2012.01)

(52) U.S. Cl.
CPC ........ *B60K 17/344* (2013.01); *B60K 23/0808* (2013.01); *F16H 48/08* (2013.01); *F16H 48/20* (2013.01); *B60K 2023/0833* (2013.01); *B60K 2023/0858* (2013.01)

(58) Field of Classification Search
CPC .... B60K 2023/0858; B60K 2023/0833; B60K 23/08; F16H 48/20; F16H 48/08
See application file for complete search history.

(56) References Cited

U.S. PATENT DOCUMENTS

| | | |
|---|---|---|
| 2015/0165901 A1* | 6/2015 | Tamoto .............. B60K 17/3462 475/230 |
| 2016/0101689 A1 | 4/2016 | Yoshimura et al. |
| 2016/0243936 A1* | 8/2016 | Yoshimura ........... B60K 17/344 |
| 2016/0263995 A1 | 9/2016 | Yoshimura et al. |
| 2018/0208057 A1 | 7/2018 | Yoshimura et al. |

FOREIGN PATENT DOCUMENTS

| | | |
|---|---|---|
| JP | 2016-168982 A | 9/2016 |
| JP | 2016-203875 A | 12/2016 |

\* cited by examiner

VEHICLE DRIVING-FORCE DISTRIBUTING DEVICE

This application claims priority from Japanese Patent Application No. 2017-184221 filed on Sep. 25, 2017, the disclosure of which is herein incorporated by reference in its entirety.

BACKGROUND OF THE INVENTION

Field of the Invention

The present invention relates to a vehicle driving-force distributing device distributing a driving force transmitted from a drive power source via a differential mechanism to left and right drive wheels and, more particularly, to a technique of increasing strength of first and second connecting/disconnecting teeth used in a connecting/disconnecting mechanism to improve durability thereof.

Description of the Related Art

A known vehicle driving-force distributing device includes (a) a ring gear disposed rotatably around a rotation axis due to a driving force transmitted from a drive power source; (b) a differential device having a differential case in which a pair of differential gears is assembled; (c) a cylindrical rotating body having first connecting/disconnecting teeth on an outer circumferential side, disposed on one end side of the differential case and rotating around the rotation axis together with the differential case; a connecting/disconnecting mechanism having second connecting/disconnecting teeth engageable with the first connecting/disconnecting teeth on an inner circumferential side, including a connecting/disconnecting sleeve spline-fitted to the inner circumferential side of the ring gear relatively movably in a rotation axis direction, and connecting/disconnecting a power transmission path between the ring gear and the differential case by moving the connecting/disconnecting sleeve between a meshing position at which the second connecting/disconnecting teeth are meshed with the first connecting/disconnecting teeth and a non-meshing position at which the second connecting/disconnecting teeth are not meshed with the first connecting/disconnecting teeth; and a synchronizing mechanism disposed between the connecting/disconnecting sleeve and the cylindrical rotating body and reducing relative rotation between the first connecting/disconnecting teeth and the second connecting/disconnecting teeth before meshing of the first connecting/disconnecting teeth and the second connecting/disconnecting teeth, and distributes a driving force transmitted from a drive power source through the meshing of the first connecting/disconnecting teeth and the second connecting/disconnecting teeth via the differential device to left and right drive wheels. For example, this corresponds to a vehicle driving-force distributing device described in Patent Document 1.

CITATION LIST

Patent Document 1: Japanese Laid-Open Patent Publication No. 2016-203875

SUMMARY OF THE INVENTION

Technical Problem

The vehicle driving-force distributing device as described in Patent Document 1 has the second connecting/disconnecting teeth formed on the inner circumferential side of the connecting/disconnecting sleeve spline-fitted to the inner circumferential side of the ring gear and moves the connecting/disconnecting sleeve in the rotation axis direction between the meshing position at which the second connecting/disconnecting teeth are meshed with the first connecting/disconnecting teeth and the non-meshing position at which the second connecting/disconnecting teeth are not meshed with the first connecting/disconnecting teeth to connect/disconnect the power transmission path between the ring gear and the differential case. However, the second connecting/disconnecting teeth disposed on the inner circumferential side of the connecting/disconnecting sleeve for the purpose of power transmission and the first connecting/disconnecting teeth meshed therewith have diameter dimensions limited due to being disposed on the inner circumferential side as compared to spline teeth for spline fitting disposed on the outer circumferential side of the connecting/disconnecting sleeve, and therefore have a problem of being disadvantageous in terms of tooth strength.

The present invention was conceived in view of the situations and it is therefore an object of the present invention to provide a vehicle driving-force distributing device in which the first connecting/disconnecting teeth and the second connecting/disconnecting teeth used for the connecting/disconnecting mechanism are advantageous in terms of strength.

Solution to Problem

To achieve the above object, a first aspect of the present invention provides a vehicle driving-force distributing device including (a) a ring gear disposed rotatably around a rotation axis and a differential device disposed rotatably around the rotation axis and including a differential case in which a pair of differential gears is assembled, the vehicle driving-force distributing device distributing a driving force transmitted from a drive power source to the ring gear through the differential device to left and right drive wheels, comprising: (b) first connecting/disconnecting teeth disposed on the inner circumferential side of the ring gear; (c) a connecting/disconnecting mechanism that includes a cylindrical member arranged concentrically with the differential gears and coupled relatively non-rotatably to a shaft insertion portion at one end portion of the differential case and a connecting/disconnecting sleeve including second connecting/disconnecting teeth on the outer circumferential side and spline-fitted movably in the rotation axis direction and relatively non-rotatably to the outer circumferential side of the shaft insertion portion and that connects and disconnects a power transmission path between the ring gear and the differential case by moving the connecting/disconnecting sleeve in the rotation axis direction between a meshing position at which the second connecting/disconnecting teeth are meshed with the first connecting/disconnecting teeth and a non-meshing position at which the second connecting/disconnecting teeth are not meshed with the first connecting/disconnecting teeth; and (d) a synchronizing mechanism disposed between the ring gear and the cylindrical member and reducing a relative rotation between the first connecting/disconnecting teeth and the second connecting/disconnecting teeth.

A second aspect of the present invention provides the vehicle driving-force distributing device wherein the connecting/disconnecting sleeve includes inner-circumferential spline teeth for spline fitting to the outer circumferential side of the shaft insertion portion, and wherein the pitch circle of the second connecting/disconnecting teeth disposed on the outer circumferential surface of the connecting/disconnecting sleeve has a larger diameter than the pitch circle of the inner-circumferential spline teeth.

A third aspect of the present invention provides the vehicle driving-force distributing device wherein the second connecting/disconnecting teeth disposed on the outer circumferential side of the connecting/disconnecting sleeve have a face width smaller than the face width of the inner-circumferential spline teeth.

A fourth aspect of the present invention provides the vehicle driving-force distributing device wherein the shaft insertion portion and the cylindrical member have the outer and inner diameters equal to each other, and wherein the shaft insertion portion and the cylindrical member are lined up and coupled to each other by a tubular coupling member having a smaller diameter than the outer diameter of the shaft insertion portion and the cylindrical member and fitted into the shaft insertion portion and the cylindrical member.

A fifth aspect of the present invention provides the vehicle driving-force distributing device wherein the synchronizing mechanism includes a friction engagement member that includes on the outer circumferential side a second tapered friction engagement surface frictionally engaged with a first tapered friction engagement surface formed on the inner circumferential surface of the ring gear and that is spline-fitted movably in the rotation axis direction and relatively non-rotatably to the outer circumferential side of the cylindrical member to move in the rotation axis direction together with the connecting/disconnecting sleeve, and the synchronizing mechanism reduces a relative rotation between the first connecting/disconnecting teeth and the second connecting/disconnecting teeth through a frictional engagement between the first tapered friction engagement surface and the second tapered friction engagement surface at the non-meshing position.

A sixth aspect of the present invention provides the vehicle driving-force distributing device wherein the connecting/disconnecting mechanism includes an actuator and a latching mechanism, and wherein the latching mechanism includes a first piston reciprocated in the rotation axis direction in accordance with an on/off operation of the actuator, a second piston disposed movably in the rotation axis direction on the outer circumferential side of the cylindrical member and driven by the first piston in the rotation axis direction to press the friction engagement member and the connecting/disconnecting sleeve, a spring urging the second piston in the backward movement direction, and a holder latching the second piston against the urging force of the spring in accordance with reciprocation of the first piston and unlatching the second piston in accordance with reciprocation of the first piston to allow the second piston to move backward in accordance with the urging force of the spring.

Advantageous Effects of the Invention

The vehicle driving-force distributing device recited in the first aspect of the invention includes: the connecting/disconnecting sleeve having the second connecting/disconnecting teeth on the outer circumferential side and spline-fitted movably in the rotation axis direction and relatively non-rotatably to the outer circumferential side of the shaft insertion portion; and the synchronizing mechanism disposed between the ring gear and the cylindrical member and reducing the relative rotation between the second connecting/disconnecting teeth and the first connecting/disconnecting teeth, and therefore, the second connecting/disconnecting teeth disposed on the outer circumferential side of the connecting/disconnecting sleeve have a larger diameter than the spline teeth for spline fitting disposed on the inner circumferential side of the connecting/disconnecting sleeve. Therefore, the second connecting/disconnecting teeth and the first connecting/disconnecting teeth meshed therewith can be improved in strength, and thus, even if the space is limited due to inclusion of the synchronizing mechanism, the vehicle driving-force distributing device can be made advantageous in terms of the strength of the first connecting/disconnecting teeth and the second connecting/disconnecting teeth, so that the first connecting/disconnecting teeth and the second connecting/disconnecting teeth can be enhanced in durability. Additionally, the synchronizing mechanism is disposed in a space between the ring gear and the cylindrical member so that the driving force is transmitted between the connecting/disconnecting sleeve and the shaft insertion portion, and therefore, for example, as compared to the case that both the cylindrical member and the shaft insertion portion must be enhanced in strength if the driving force is transmitted between the connecting/disconnecting sleeve and the cylindrical member, the strength is advantageously enhanced by increasing only the strength of the shaft insertion portion.

According to the vehicle driving-force distributing device recited in the second aspect of the invention, the connecting/disconnecting sleeve has the inner-circumferential spline teeth for spline fitting to the outer circumferential side of the shaft insertion portion, and the pitch circle of the second connecting/disconnecting teeth disposed on the outer circumferential surface of the connecting/disconnecting sleeve has a larger diameter than the pitch circle of the inner-circumferential spline teeth. As a result, the second connecting/disconnecting teeth and the first connecting/disconnecting teeth meshed therewith can be improved in strength, and even if the space is limited due to disposition of the synchronizing mechanism, the vehicle driving-force distributing device can be made advantageous in terms of the strength of the second connecting/disconnecting teeth and the first connecting/disconnecting teeth.

According to the vehicle driving-force distributing device recited in the third aspect of the invention, the second connecting/disconnecting teeth disposed on the outer circumferential side of the connecting/disconnecting sleeve have a face width smaller than the face width of the inner-circumferential spline teeth. As a result, the reciprocating stroke of the connecting/disconnecting sleeve can be reduced. Therefore, the vehicle driving-force distributing device can be made smaller in the dimension in the rotation axis direction.

According to the vehicle driving-force distributing device recited in the fourth aspect of the invention, the shaft insertion portion and the cylindrical member have the outer and inner diameters equal to each other, and the shaft insertion portion and the cylindrical member are lined up and relatively non-rotatably coupled to each other by the tubular coupling member having a smaller diameter than the outer diameter of the shaft insertion portion and the cylindrical member and fitted into the shaft insertion portion and the cylindrical member. As a result, the radial dimension of the vehicle driving-force distributing device is further reduced.

According to the vehicle driving-force distributing device recited in the fifth aspect of the invention, the synchronizing mechanism includes the friction engagement member that has on the outer circumferential side the second tapered friction engagement surface frictionally engageable with the first tapered friction engagement surface formed on the inner circumferential surface of the ring gear and that is spline-fitted movably in the rotation axis direction and relatively non-rotatably to the outer circumferential side of the cylindrical member to move in the rotation axis direction together with the connecting/disconnecting sleeve, and the relative rotation between the first connecting/disconnecting teeth and the second connecting/disconnecting teeth is reduced through the frictional engagement between the first tapered friction engagement surface and the second tapered friction engagement surface at the second non-meshing position. As a result, since the relative rotation between the ring gear and the connecting/disconnecting sleeve is reduced before the meshing of the second connecting/disconnecting teeth with the first connecting/disconnecting teeth, gear noise and wear are preferably suppressed between the first connecting/disconnecting teeth and the second connecting/disconnecting teeth.

According to the vehicle driving-force distributing device recited in the sixth aspect of the invention, the connecting/disconnecting mechanism includes the actuator and the latching mechanism, and the latching mechanism includes the first piston reciprocated in the rotation axis direction in accordance with the on/off operation of the actuator, the second piston disposed movably in the rotation axis direction on the outer circumferential side of the cylindrical member and driven by the first piston in the rotation axis direction to press the friction engagement member and the connecting/disconnecting sleeve, the spring urging the second piston in the backward movement direction, and the holder latching the second piston against the urging force of the spring in accordance with reciprocation of the first piston and unlatching the second piston in accordance with reciprocation of the first piston to allow the second piston to move backward in accordance with the urging force of the spring. As a result, it is only necessary to drive the actuator for a relatively short time for moving the connecting/disconnecting sleeve backward and forward, so that power consumption can be reduced.

DESCRIPTION OF THE PREFERRED EMBODIMENTS

In an embodiment of the present invention, a driving-force distributing device of the present invention is applicable not only to a vehicle including an engine as a drive power source but also to a vehicle using an electric motor as a drive power source.

In an embodiment of the present invention, the driving-force distributing device of the present invention is suitably used for distributing a driving force to a pair of left and right rear wheels of a vehicle.

Embodiment of the present invention will now be described in detail with reference to the drawings. In the following example, the figures are simplified or deformed as needed and portions are not necessarily precisely drawn in terms of dimension ratio, shape, etc.

Embodiment

Figure 1:
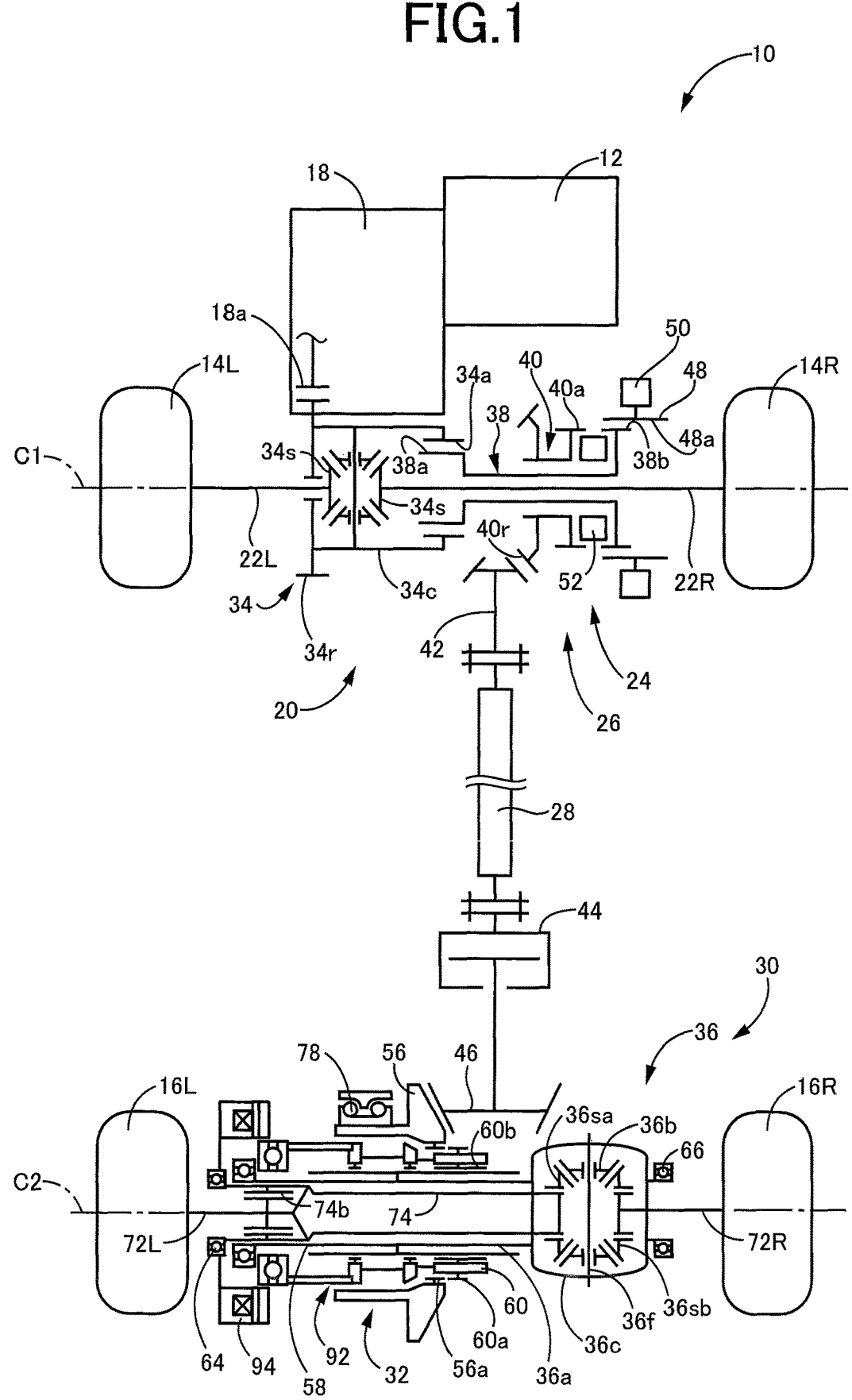
FIG. 1 is a skeleton diagram for generally explaining a configuration of a four-wheel-drive vehicle 10 to which the present invention is preferably applied.

FIG. 1 is a skeleton diagram for generally explaining a configuration of a four-wheel-drive vehicle 10 to which the present invention is preferably applied. In FIG. 1, the four-wheel-drive vehicle 10 includes a four-wheel-drive device of an FF type having a first power transmission path transmitting a driving force of an engine 12 serving as a drive power source to a pair of left and right front wheels 14L, 14R (also referred to as "front wheels 14") corresponding to main drive wheels and a second power transmission path transmitting the driving force of the engine 12 to a pair of left and right rear wheels 16L, 16R (also referred to as "rear wheels 16") corresponding to auxiliary drive wheels.

In a two-wheel-drive state of the four-wheel-drive vehicle 10, the driving force transmitted from the engine 12 via an automatic transmission 18 is transmitted through a front-wheel driving-force distributing device 20 and left and right axles 22L, 22R to the left and right front wheels 14L, 14R. In this two-wheel-drive state, at least a first clutch 24 is released, and no driving force is transmitted to a transfer 26 as well as a propeller shaft 28, a rear-wheel driving-force distributing device (vehicle driving-force distributing device) 30 and the rear wheels 16L, 16R. However, in a four-wheel-drive state, the first clutch 24 and a second clutch (connecting/disconnecting mechanism) 32 are both engaged, and the driving force from the engine 12 is transmitted to the transfer 26 as well as the propeller shaft 28, the rear-wheel driving-force distributing device 30 and the rear wheels 16L, 16R.

In the two-wheel-drive state and the four-wheel-drive state of the four-wheel-drive vehicle 10, the front-wheel driving-force distributing device 20 distributes the driving force transmitted from the engine 12 via a first differential device 34 to the front wheels (drive wheels) 14L, 14R. In the four-wheel-drive state of the four-wheel-drive vehicle 10, the rear-wheel driving-force distributing device 30 distributes the driving force transmitted from the engine 12 via a second differential device (differential device) 36 to the rear wheels (drive wheels) 16L, 16R. Although not shown in FIG. 1, a torque converter, a fluid coupling, or a clutch is disposed as a hydraulic power transmission between the engine 12 and the automatic transmission 18.

The front-wheel driving-force distributing device 20 includes, in a rotatable manner around a first rotation axis C1, the first differential device 34 having a ring gear 34r meshed with an output gear 18a of the automatic transmission 18 and a differential case 34c integrally fixed to the ring gear 34r and having a pair of differential gears 34s assembled therein such that the first differential device 34 transmits the driving force from the engine 12 to the left and right axles 22L, 22R of the front wheels 14L, 14R while allowing a differential rotation thereof. The differential case 34c is provided with inner-circumferential fitting teeth 34a fitted to outer-circumferential fitting teeth 38a formed on an axial end portion on the first differential device 34 side of a first rotating member 38 disposed in the transfer 26. As a result, a portion of the driving force transmitted from the engine 12 to the front wheels 14L, 14R is transmitted from the differential case 34c to the transfer 26.

As shown in FIG. 1, the transfer 26 includes the first rotating member 38 provided with the outer-circumferential fitting teeth 38a and a second rotating member 40 having an integrally-formed ring gear 40r for transmitting the driving force toward the rear wheels 16L, 16R. In the transfer 26, a power transmission path between the first rotating member 38 and the second rotating member 40 is selectively connected/disconnected (i.e., in power transmittable state/in cut-off state) by the first clutch 24 made up of a meshing-type dog clutch.

As shown in FIG. 1, the first rotating member 38 is a cylindrical member an inner circumferential side of which the axle 22R penetrates and is disposed concentrically with the axle 22R and the second rotating member 40, i.e., rotatably around the first rotation axis C1. First clutch teeth 38b constituting a portion of the first clutch 24 are integrally formed on an axial end portion of the first rotating member 38 on the side opposite to the first differential device 34.

As shown in FIG. 1, the second rotating member 40 is a cylindrical member an inner circumferential side of which the axle 22R penetrates and the first rotating member 38 on the inner circumferential side and is disposed concentrically with the axle 22R and the first rotating member 38, i.e., rotatably around the first rotation axis C1. The ring gear 40r meshed with a driven pinion 42 is formed integrally with an axial end portion of the second rotating member 40 on the first differential device 34 side, and second clutch teeth 40a constituting a portion of the first clutch 24 are integrally formed with an axial end portion of the second rotating member 40 on the side opposite to the first differential device 34. The driven pinion 42 is coupled to an end portion of the propeller shaft 28 on the front wheel 14 side, and a drive pinion 46 is disposed, via a control coupling 44 capable of controlling a transmission torque by an electronic control device not shown, at an end portion of the propeller shaft 28 on the rear wheel 16 side.

The first clutch 24 is a meshing clutch for connecting/disconnecting between the first rotating member 38 and the second rotating member 40 and is a meshing-type dog clutch including a sleeve 48 provided with inner circumferential teeth 48a constantly meshed with the first clutch teeth 38b formed on the first rotating member 38 while relatively movably in the first rotation axis C1 direction and capable of meshing with the second clutch teeth 40a formed on the second rotating member 40 through the movement in the first rotation axis C1 direction, and a first actuator 50 driving the sleeve 48 between a first non-meshing position and a first meshing position in the first rotation axis C1 direction. The first meshing position is a position to which the sleeve 48 moves in the first rotation axis C1 direction so that the inner circumferential teeth 48a of the sleeve 48 are meshed with the second clutch teeth 40a of the second rotating member 40, and the first non-meshing position is a position to which the sleeve 48 moves in the first rotation axis C1 direction so that the inner circumferential teeth 48a of the sleeve 48 are not meshed with the second clutch teeth 40a of the second rotating member 40. The first actuator 50 is made up of an actuator electrically controllable by using an electromagnet, for example. The first clutch 24 preferably includes a synchronizing mechanism 52 reducing a difference in relative rotation between the sleeve 48 and the second rotating member 40 when the inner circumferential teeth 48a of the sleeve 48 are meshed with the second clutch teeth 40a of the second rotating member 40. FIG. 1 shows a state in which the first clutch 24 is released.

Figure 2:
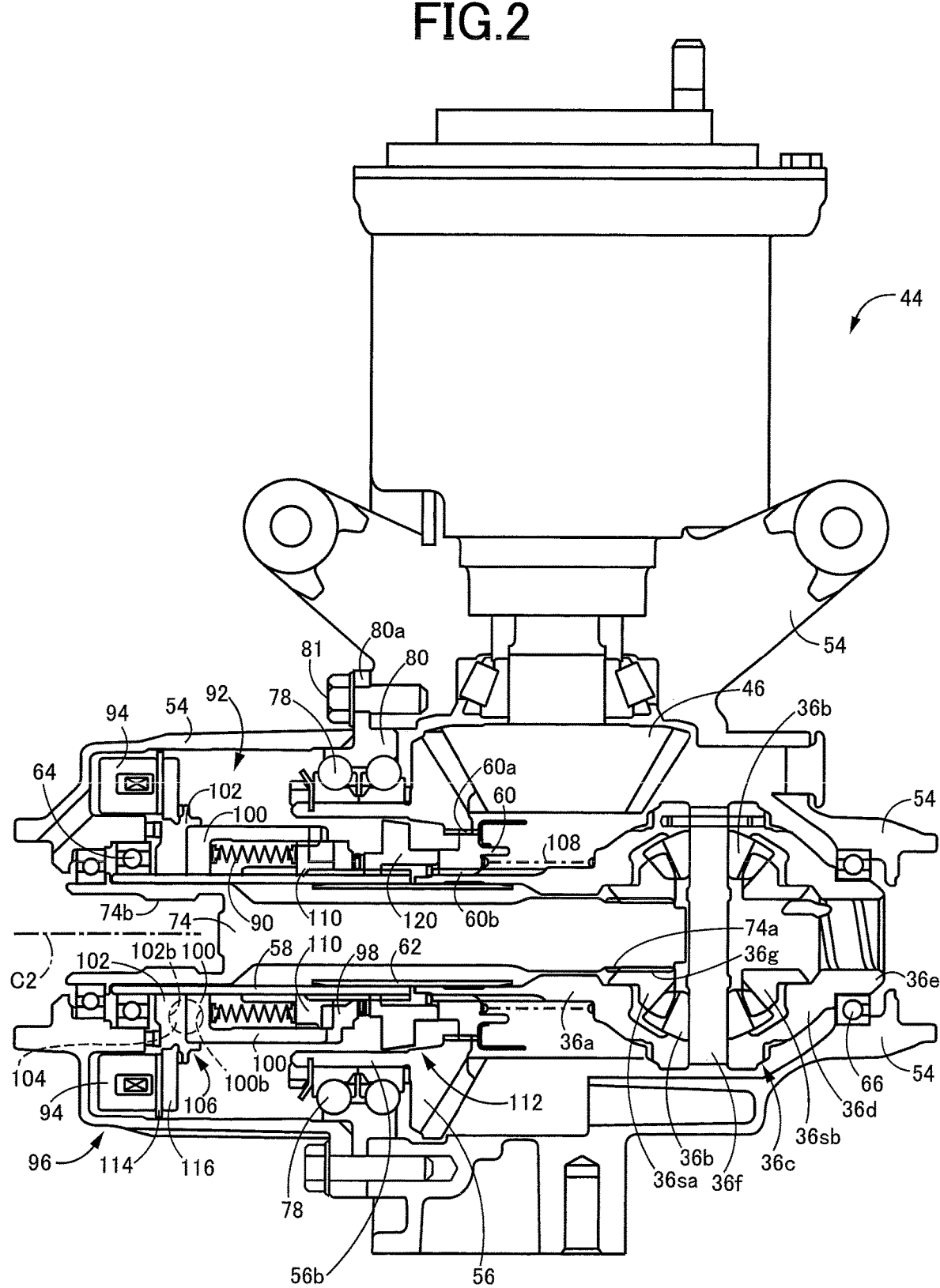
FIG. 2 is a cross-sectional view for explaining a configuration of a rear-wheel driving-force distributing device disposed on the four-wheel-drive vehicle of FIG. 1.

As shown in FIGS. 1 and 2, the rear-wheel driving-force distributing device 30 includes the second differential device (differential device) 36 having a differential case 36c in which a pair of differential gears 36sa, 36sb is assembled, and a differential carrier 54 that is a non-rotating member fixed to a vehicle body not shown in a state of housing the second differential device 36 and that supports the differential case 36c via bearings 64 and 66 rotatably around a second rotation axis (rotation axis) C2 and immovably in a second rotation axis C2 direction. To one differential gear 36sa of the paired differential gears 36sa, 36sb, an axle 72L is coupled by spline fitting via an intermediate shaft 74 described later, and an axle 72R is coupled by spline fitting to the other differential gear 36sb (see FIG. 1).

The rear-wheel driving-force distributing device 30 includes: a second clutch (connecting/disconnecting mechanism) 32 that includes a cylindrical ring gear 56 provided with inner-circumferential connecting/disconnecting teeth (first connecting/disconnecting teeth) 56a on the inner circumferential side, a cylindrical member 58 having cylindrical shape and arranged concentrically with the differential gears 36sa and 36sb and coupled relatively non-rotatably to a shaft insertion portion 36a at one end portion of the differential case 36c and a connecting/disconnecting sleeve 60 having outer-circumferential connecting/disconnecting teeth (second connecting/disconnecting teeth) 60a on the outer circumferential side and spline-fitted movably in the second rotation axis C2 direction and relatively non-rotatably to the outer circumferential side of the shaft insertion portion 36a and that connects and disconnects a power transmission path between the ring gear 56 and the differential case 36c by moving the connecting/disconnecting sleeve 60 in the second rotation axis C2 direction between a second meshing position (meshing position) at which the outer-circumferential connecting/disconnecting teeth 60a are meshed with the inner-circumferential connecting/disconnecting teeth 56a and a second non-meshing position (non-meshing position) at which the outer-circumferential connecting/disconnecting teeth 60a are not meshed with the inner-circumferential connecting/disconnecting teeth 56a; and a synchronizing mechanism 112 (see FIG. 2) disposed between the ring gear 56 and the cylindrical member 58 and reducing relative rotation between the outer-circumferential connecting/disconnecting teeth 60a and the inner-circumferential connecting/disconnecting teeth 56a immediately before the outer-circumferential connecting/disconnecting teeth 60a are meshed with the inner-circumferential connecting/disconnecting teeth 56a.

Additionally, the rear-wheel driving-force distributing device 30 is provided with the intermediate shaft 74 inserted through the cylindrical member 58 and the shaft insertion portion 36a of the differential case 34c and having an end portion (one end portion) on the second differential device 36 side coupled to the differential gear 36sa and an end portion (the other end portion) on the side opposite to the second differential device 36 side coupled to the axle (drive shaft) 72L (see FIG. 1) in a power transmittable manner.

As shown in FIG. 2, the differential case 36c integrally includes a main body portion 36d housing the pair of the differential gears 36sa, 36sb and a pair of pinion gears 36b meshed with the pair of the differential gears 36sa, 36sb, the shaft insertion portion 36a cylindrically projected from an end portion of the main body portion 36d on the rear wheel 16L side toward the rear wheel 16L, and a projection portion 36e cylindrically projected from an end portion of the main body portion 36d on the rear wheel 16R side toward the rear wheel 16R. The differential case 36c integrally includes a columnar pinion shaft 36f (see FIG. 2) rotatably supporting the pair of the pinion gears 36b.

Inner-circumferential spline teeth 36g are formed on the differential gear 36sa in the differential case 36c, and outer circumferential spline teeth 74a formed on an end portion of the intermediate shaft 74 on the second differential device 36 side are fitted, i.e., spline-fitted, to the inner-circumferential spline teeth 36g of the differential gear 36sa. Inner-circumferential spline teeth 74b are formed on an inner circumference side of an end portion of the intermediate shaft 74 on the side opposite to the second differential device 36 side, and an end portion of the axle 72L on the second differential device 36 side (see FIG. 1) are spline-fitted to the inner-circumferential spline teeth 74b of the intermediate shaft 74.

The ring gear 56 is a cylindrical member supported by the differential carrier 54 via a bearing 78 rotatably around the second rotation axis C2 and immovably in the second rotation axis C2 direction and meshed with the drive pinion 46 and has an inner circumferential surface with the inner-circumferential connecting/disconnecting teeth 56a formed at an end portion on the second differential device (differential device) 36 side. The ring gear 56 is, for example, a bevel gear formed as a hypoid gear, and a shaft portion 56b is formed into a substantially cylindrical shape projected from an inner circumferential portion of the ring gear 56 toward the rear wheel 16L. The cylindrical ring gear 56 is supported in a cantilever manner rotatably around the second rotation axis C2 since the shaft portion 56b of the ring gear 56 is supported by the differential carrier 54 via the bearing 78. The bearing 78 is provided with a flange portion 80a annularly projecting from an outer ring 80 of the bearing 78 to the outer circumferential side, and the flange portion 80a is fastened to the differential carrier 54 by a bolt 81 (see FIG. 2) so that the bearing 78 is fixed to the differential carrier 54.

The shaft insertion portion 36a is a cylindrical portion projected in the second rotation axis C2 direction from an end portion (one end portion) of the differential case 36c on the rear wheel 16L side. The cylindrical member 58 has an outer diameter and an inner diameter equal to those of the shaft insertion portion 36a and is abutted on an end surface of the shaft insertion portion 36a on the rear wheel 16L side and relatively non-rotatably coupled in an integrally lined-up state in the second rotation axis C2 direction by a tubular coupling member 62 having a smaller diameter than the shaft insertion portion 36a and interference-fitted or spline-fitted into the cylindrical member 58 and the shaft insertion portion 36a. The tubular coupling member 62 non-rotatably couples the shaft insertion portion 36a and the cylindrical member 58 by, for example, spline fitting or press fitting of outer circumferential spline teeth formed on an outer circumferential surface thereof and inner-circumferential spline teeth formed on inner circumferential surfaces of the shaft insertion portion 36a and the cylindrical member 58. Although the cylindrical member 58 may be formed integrally with the shaft insertion portion 36a, the cylindrical member 58 is formed separately from the shaft insertion portion 36a so that easiness of assembly is enhanced.

The connecting/disconnecting sleeve 60 has the outer circumferential contact teeth 60a formed on the outer circumferential surface, i.e., the outer circumferential side thereof, and inner-circumferential spline teeth 60b formed on the inner circumferential surface, i.e., the inner circumferential side thereof, and is disposed on the outer circumferential side of the shaft insertion portion 36a movably in the second rotation axis C2 direction and relatively non-rotatably with respect to the shaft insertion portion 36a due to constant spline fitting of the inner-circumferential spline teeth 60b to outer-circumferential spline teeth 36aa formed on an outer circumferential surface of the shaft insertion portion 36a. The connecting/disconnecting sleeve 60 has an annular shape or a short cylindrical shape, and a pitch circle of the outer-circumferential connecting/disconnecting teeth 60a formed on the outer circumferential surface having a relatively large diameter has a larger diameter than a pitch circle of the inner-circumferential spline teeth 60b formed on the inner circumferential surface having a relatively small diameter. The outer-circumferential connecting/disconnecting teeth 60a disposed on the outer circumferential side of the connecting/disconnecting sleeve 60 have a face width longer than a movement stroke ST due to driving of a ball cam 106 described later and smaller than that of the inner-circumferential spline teeth 60b (see FIG. 1).

The second clutch 32 functions as a connecting/disconnecting mechanism connecting and disconnecting the power transmission path between the ring gear 56 and the differential case 36c by moving the connecting/disconnecting sleeve 60 in the second rotation axis C2 direction between the second meshing position (meshing position) at which the outer-circumferential connecting/disconnecting teeth 60a of the connecting/disconnecting sleeve 60 are meshed with the inner-circumferential connecting/disconnecting teeth 56a of the ring gear 56 and the second non-meshing position (non-meshing position) at which the outer-circumferential connecting/disconnecting teeth 60a of the connecting/disconnecting sleeve 60 are not meshed with the inner-circumferential connecting/disconnecting teeth 56a of the ring gear 56.

As shown in FIG. 2, the second clutch 32 functioning as the connecting/disconnecting mechanism includes: a control clutch 96 activated by an electromagnet 94 functioning as an actuator; a ratchet mechanism, i.e., latching mechanism 92, moving the connecting/disconnecting sleeve 60 in the second rotation axis C2 direction to move the connecting/disconnecting sleeve 60 between the second meshing position and the second non-meshing position; and the synchronizing mechanism 112 reducing a difference in relative rotation between the inner-circumferential connecting/disconnecting teeth 56a and the outer-circumferential connecting/disconnecting teeth 60a before meshing of the outer-circumferential connecting/disconnecting teeth 60a disposed on the outer circumferential side of the connecting/disconnecting sleeve 60 with the inner-circumferential connecting/disconnecting teeth 56a disposed on the inner circumferential side of the ring gear 56.

As shown in FIG. 2, the electromagnet 94 of annular shape acting as the actuator is assembled in the differential carrier 54 along with an annular movable piece 116 adjacent to the electromagnet 94 via an annular friction plate 114 and magnetically attractable to the electromagnet 94. The friction plate 114 is relatively non-rotatably coupled to a second cam 102 on its outer circumferential side while the second cam 102 is disposed relatively rotatably around the second rotation axis C2 with respect to the cylindrical member 58. The control clutch 96 is made up of the electromagnet 94, the movable piece 116, and the friction plate 114, and when the movable piece 116 is attracted due to the activation of the electromagnet 94, a rotation braking torque is transmitted to the friction plate 114 and the second cam 102 relatively non-rotatably coupled thereto.

As shown in FIG. 2, the latching mechanism 92 includes a first spring 90, a second piston 98, the ball cam 106, a second spring 108 (spring), and a holder 110. The second piston 98 is disposed on the outer circumferential side of the cylindrical member 58 rotatably around the second rotation axis C2 and movably in the second rotation axis C2 direction. The second piston 98 presses the connecting/disconnecting sleeve 60 via a friction engagement member 120 described later and moves the connecting/disconnecting sleeve 60 to the second non-meshing position against the urging force of the second spring 108.

The ball cam 106 has an annular-shaped pair of a first cam 100 (first piston) and a second cam 102 interposed between the second piston 98 and the bearing 64 to overlap with the second piston 98 and the bearing 64 in the second rotation axis C2 direction and relatively rotated around the second rotation axis C2 due to the activation of the electromagnet 94, and multiple (e.g., three) spherical rolling elements 104 put between a pair of mutually facing groove-shaped cam surfaces 100b, 102b each having a depth varying along longitudinal (circumferential) direction and formed at multiple positions (e.g., three positions) in a circumferential direction in the first cam 100 and the second cam 102, and when the pair of the first cam 100 and the second cam 102 is relatively rotated around the second rotation axis C2, the first cam 100 and the second cam 102 are separated in the second rotation axis C2 direction, and the first cam 100 is moved toward the second piston 98. Although not shown, an inner circumferential surface of the first cam 100 is provided with inner circumferential meshing teeth meshed relatively non-rotatably and movably in the second rotation axis C2 direction with outer-circumferential spline teeth formed on the cylindrical member 58. When the cylindrical member 58 rotates, for example, around the second rotation axis C2, the first cam 100 also rotates about the second rotation axis C2 and, for example, when the electromagnet 94 acting as the actuator is not operating, the second cam 102 rotates integrally with the first cam 100 via the spherical rolling element 104.

The first spring 90 is interposed between the first cam 100 and the holder 110 in a preloaded state and urges the first cam 100 toward the second cam 102. The second spring 108 urges the second piston 98 to the side away from the second differential device 36 in the second rotation axis C2 direction via the connecting/disconnecting sleeve 60 and the friction engagement member 120. The holder 110 has latching teeth 110a (see FIG. 3) and is disposed relatively non-rotatably around the second rotation axis C2 and immovably in the second rotation axis C2 direction with respect to the cylindrical member 58 to latch the second piston 98 with the latching teeth 110a.

In the latching mechanism 92 configured as described above, for example, when the movable piece 116 is attracted to the electromagnet 94 due to activation of the electromagnet 94 acting as the actuator while the vehicle 10 is running and the cylindrical member 58 is rotating around the second rotation axis C2, the rotation braking torque is transmitted to the friction plate 114 and the second cam 102 relatively non-rotatably coupled thereto. This rotation braking torque causes relative rotation between the first cam 100 relatively non-rotatable around the second rotation axis C2 with respect to the cylindrical member 58 and the second cam 102 relatively rotatable around the second rotation axis C2 with respect to the cylindrical member 58, so that the first cam 100 moves forward via the spherical rolling element 104 toward the second piston 98 against the urging force of the first spring 90 in the second rotation axis C2 direction while the second piston 98 is pressed by the first cam 100. When the electromagnet 94 is put into a deactivated state, the first cam 100 is separated from the second piston 98 by the urging force of the first spring 90, and the first cam 100 moves backward in the direction toward the second cam 102 due to the urging force of the first spring 90.

FIGS. 3A to 3E are a schematic views for explaining an operation principle of the latching mechanism 92 and shows a state in which the annular second piston 98, a pressing portion 100c of the annular first cam 100, and the annular holder 110 are each developed. As shown in FIGS. 3A to 3E, the annular second piston 98 is provided with a projection 98a projected toward the holder 110. The annular holder 110 has the latching teeth 110a periodically formed into a saw tooth shape and arranged in the circumferential direction for latching the projection 98a of the second piston 98, and the holder 110 is disposed at a fixed position on the cylindrical member 58.

The pressing portion 100c of the annular first cam 100 has receiving teeth 100d periodically formed into the saw tooth shape similar to the latching teeth 110a of the holder 110 and arranged in the circumferential direction in a shape shifted by a predetermined phase in the circumferential direction to receive the projection 98a of the second piston 98. The pressing portion 100c of the annular first cam 100 is disposed relatively non-rotatably and movably in the second rotation axis C2 direction with respect to the holder 110, and can move the second piston 98 by one stroke of the ball cam 106 against the urging forces of the first spring 90 and the second spring 108. Slopes at tips of the receiving teeth 100d of the pressing portion 100c of the first cam 100 and the latching teeth 110a of the holder 110 are respectively provided with stoppers 100e and 110b stopping a slip of the projection 98a of the second piston 98.

Figure 3A:
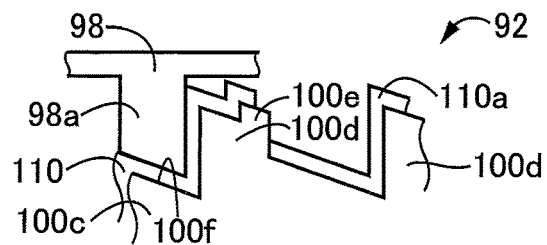
FIGS. 3A to 3E are schematic views for explaining an operation principle of a latching mechanism included in the rear-wheel driving-force distributing device of FIG. 2.
Figure 3B:
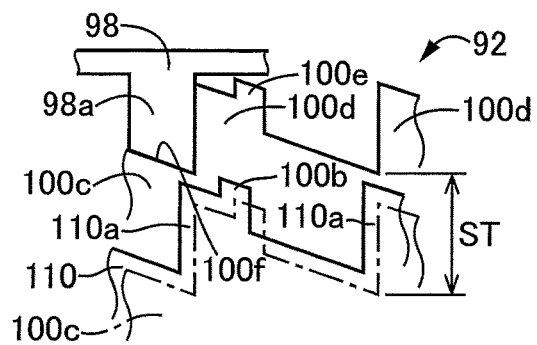
Figure 3C:
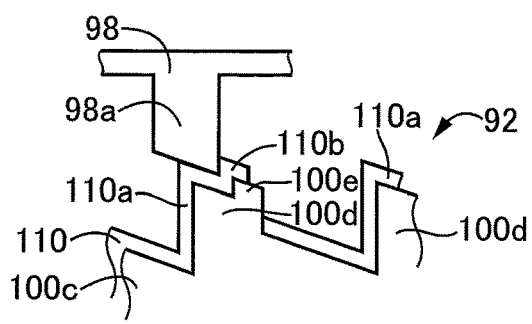
Figure 3D:
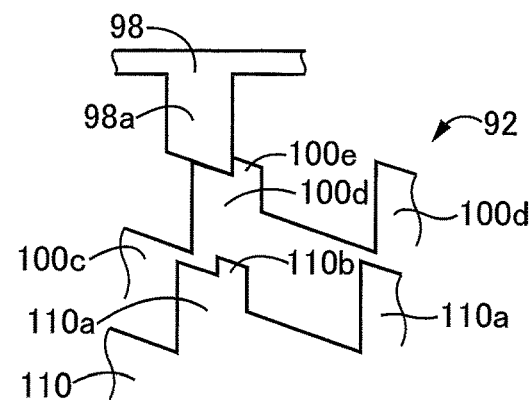
Figure 3E:
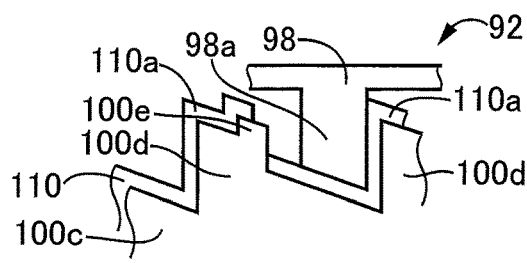

FIGS. 3A and 3E show the disconnection sleeve 60 positioned at the second meshing position. As shown in FIGS. 3A and 3E, while the projection 98a projected from the second piston 98 is positioned at a position unlatched from the latching teeth 110a of the holder 110, the connecting/disconnecting sleeve 60 is positioned at the second meshing position in accordance with the urging force of the second spring 108.

FIG. 3B shows a state in which the second piston 98 is moved from the base position thereof against the urging forces of the first spring 90 and the second spring 108 by the movement stroke ST due to driving of the ball cam 106 resulting from energization of the electromagnet 94 acting as the actuator. In this process, the second piston 98 is moved by the pressing portion 100c of the first cam 100 and is separated from the holder 110, and the second piston 98 slips down a slope 100f of the pressing portion 100c in the first cam 100. A dashed-dotted line shown in FIG. 3B indicates the base position of the pressing portion 100c in the first cam 100 of FIG. 3A for explaining the movement stroke ST.

In a state shown in FIG. 3C, due to non-driving of the ball cam 106 resulting from non-energization of the electromagnet 94, the pressing portion 100c of the first cam 100 is returned by the movement stroke ST in accordance with the urging forces of the first return spring 90 and is positioned at the base position. In this process, the second piston 98 is latched on the latching teeth 110a of the holder 110 against the urging force of the second spring 108, and the connecting/disconnecting sleeve 60 is positioned at the second non-meshing position.

In a state shown in FIG. 3D, since the ball cam 106 is driven due to driving of the ball cam 106 resulting from energization of the electromagnet 94, the pressing portion 100c of the first cam 100 is moved again by the movement stroke ST from the base position against the urging forces of the first spring 90 and the second spring 108. In this process, the second piston 98 is further moved toward the second differential device 36, and a rotation speed of the ring gear 56 and a rotation speed of the first connecting/disconnecting sleeve 60 are synchronized by the synchronizing mechanism 112.

Subsequently, as shown in FIG. 3E, as the pressing portion 100c of the first cam 100 is returned toward the base position in accordance with the urging forces of the first spring 90 and the second spring 108 due to non-driving of the ball cam 106 resulting from non-energization of the electromagnet 94, the second piston 98 is unlatched from the latching teeth 110a of the holder 110 and returned to the position unlatched from the latching teeth 110a of the holder 110 in accordance with the urging force of the second spring 108, so that the connecting/disconnecting sleeve 60 is positioned at the second meshing position.

As a result, the latching mechanism 92 forwards the second piston 98 in the circumferential direction through the reciprocation of the first cam 100 in the ball cam 106 so as to move the connecting/disconnecting sleeve 60 toward the second non-meshing position and the second meshing position. Specifically, when the second piston 98 is reciprocated once by the first cam 100, the connecting/disconnecting sleeve 60 is positioned at the second non-meshing position. When the second piston 98 reciprocates twice by the first cam 100, i.e., when the second piston 98 is further reciprocated once by the first cam 100 while the connecting/disconnecting sleeve 60 is at the second non-meshing position, the second piston 98 is unlatched from the latching teeth 110a of the holder 110 so that the connecting/disconnecting sleeve 60 is positioned at the second meshing position by the urging force of the second spring 108.

In the four-wheel-drive vehicle 10 configured as described above, for example, when a two-wheel-drive running mode is selected by the electronic control device not shown in the four-wheel-drive state in which both the first clutch 24 and the second clutch 32 are engaged, the first actuator 50 moves the sleeve 48 to the first non-meshing position to release the first clutch 24, while the deactivated state of the electromagnet 94 brings the connecting/disconnecting sleeve 60 to move to the second non-meshing position in the rear-wheel driving-force distributing device 30 to release the second clutch 32, resulting in the two-wheel-drive state in which the driving force from the engine 12 is transmitted only to the front wheels 14 that are main drive wheels.

When a four-wheel-drive running mode is selected by the electronic control device not shown in the two-wheel-drive state in which the first clutch 24 and the second clutch 32 are both released, i.e., in a disconnected state in which the power transmission path between the engine 12 and the propeller shaft 28 and the power transmission path between the rear wheels 16 and the propeller shaft 28 are respectively disconnected, for example, the first actuator 50 moves the sleeve 48 to the first meshing position to engage the first clutch 24, while an activated state of the electromagnet 94 brings the connecting/disconnecting sleeve 60 to move to the second meshing position after the engagement of the first clutch 24 to engage the second clutch 32, thereby canceling the disconnected state.

Figure 4:
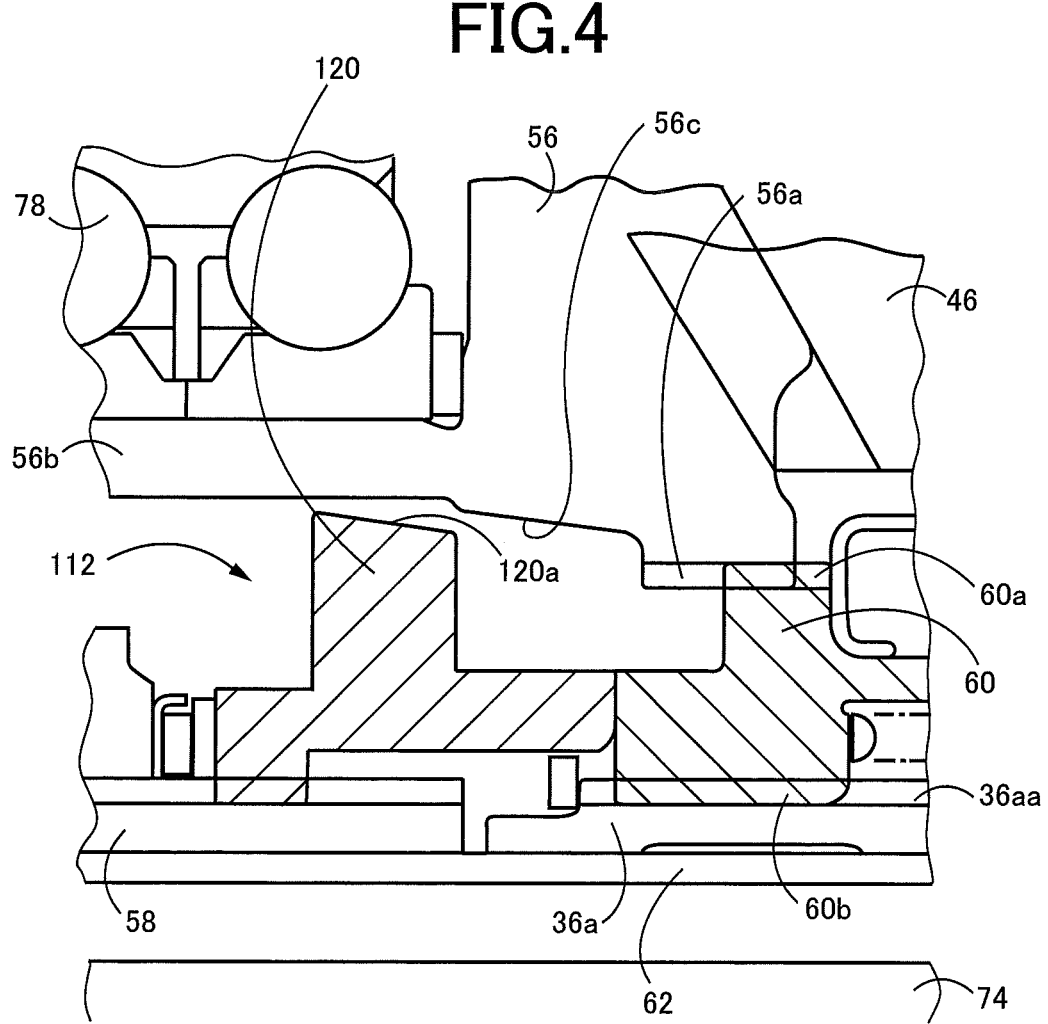
FIG. 4 is an enlarged cross-sectional view for explaining a synchronizing mechanism of the rear-wheel driving-force distributing device of FIG. 2 in detail.

As shown in detail in FIG. 4, the synchronizing mechanism 112 includes the friction engagement member 120 that has on the outer circumferential side a second tapered friction engagement surface 120a frictionally engageable with a first tapered friction engagement surface 56c formed on an inner circumferential surface of the ring gear 56 and that is spline-fitted movably in the second rotation axis C2 direction and relatively non-rotatably to the outer circumferential side of the cylindrical member 58 to move in the second rotation axis C2 direction together with the connecting/disconnecting sleeve 60, and reduces the relative rotation between the inner-circumferential connecting/disconnecting teeth 56a of the ring gear 56 and the outer-circumferential connecting/disconnecting teeth 60a of the connecting/disconnecting sleeve 60 before the meshing thereof through the frictional engagement between the first tapered friction engagement surface 56c and the second tapered friction engagement surface 120a at the second non-meshing position. The friction engagement member 120 is disposed between the second piston 98 and the connecting/disconnecting sleeve 60 and is pressed by the second piston 98 to reciprocate together with the second piston 98.

As described above, the driving-force distributing device 30 for the rear wheels of this example includes: the inner-circumferential connecting/disconnecting teeth 56a disposed on the inner circumferential side of the ring gear 56; the second clutch (connecting/disconnecting mechanism) 32 that includes the cylindrical member 58 arranged concentrically with the differential gears 36sa, 36sb and coupled relatively non-rotatably to the shaft insertion portion 36a at one end portion of the differential case 36c and the connecting/disconnecting sleeve 60 having the outer-circumferential connecting/disconnecting teeth 60a on the outer circumferential side and spline-fitted movably in the second rotation axis C2 direction and relatively non-rotatably to the outer circumferential side of the shaft insertion portion 36a and that connects and disconnects the power transmission path between the ring gear 56 and the differential case 36c by moving the connecting/disconnecting sleeve 60 in the second rotation axis C2 direction between the second meshing position at which the outer-circumferential connecting/disconnecting teeth 60a are meshed with the inner-circumferential connecting/disconnecting teeth 56a and the second non-meshing position at which the outer-circumferential connecting/disconnecting teeth 60a are not meshed with the inner-circumferential connecting/disconnecting teeth 56a; and the synchronizing mechanism 112 disposed between the ring gear 56 and the cylindrical member 58 and reducing the relative rotation between the outer-circumferential connecting/disconnecting teeth 60a and the inner-circumferential connecting/disconnecting teeth 56a, and therefore, the outer-circumferential connecting/disconnecting teeth 60a disposed on the outer circumferential side of the connecting/disconnecting sleeve 60 have a larger diameter than the inner-circumferential spline teeth 60b on the inner circumferential side of the connecting/disconnecting sleeve 60.

Therefore, the outer-circumferential connecting/disconnecting teeth 60a and the inner-circumferential connecting/disconnecting teeth 56a meshed therewith can be improved in strength, and thus, even if the space is limited due to inclusion of the synchronizing mechanism 112, the driving-force distributing device 30 can be made advantageous in terms of the strength of the inner-circumferential connecting/disconnecting teeth 56a and the outer-circumferential connecting/disconnecting teeth 60a, so that the inner-circumferential connecting/disconnecting teeth 56a and the outer-circumferential connecting/disconnecting teeth 60a can be enhanced in durability. Additionally, the synchronizing mechanism 112 is disposed in a space between the ring gear 56 and the cylindrical member 58 so that the driving force is transmitted between the connecting/disconnecting sleeve 60 and the shaft insertion portion 36a, and therefore, for example, as compared to the case that both the cylindrical member 58 and the shaft insertion portion 36a must be enhanced in strength if the driving force is transmitted between the connecting/disconnecting sleeve 60 and the cylindrical member 58, the strength is advantageously enhanced by increasing only the strength of the shaft insertion portion 36a.

According to the driving-force distributing device 30 of this example, the connecting/disconnecting sleeve 60 has the inner-circumferential spline teeth 60b for spline fitting to the outer circumferential side of the shaft insertion portion 36a, and the pitch circle of the outer-circumferential connecting/disconnecting teeth 60a disposed on the outer circumferential side of the connecting/disconnecting sleeve 60 has a larger diameter than the pitch circle of the inner-circumferential spline teeth 60b. As a result, the outer-circumferential connecting/disconnecting teeth 60a and the inner-circumferential connecting/disconnecting teeth 56a meshed therewith can be improved in strength, and even if the space is limited due to disposition of the synchronizing mechanism 112, the driving-force distributing device 30 can be made advantageous in terms of the strength of the outer-circumferential connecting/disconnecting teeth 60a and the inner-circumferential connecting/disconnecting teeth 56a meshed therewith.

According to the driving-force distributing device 30 of this example, the outer-circumferential connecting/disconnecting teeth 60a disposed on the outer circumferential side of the connecting/disconnecting sleeve 60 have a face width smaller than the face width of the inner-circumferential spline teeth 60b disposed on the inner circumferential side of the connecting/disconnecting sleeve 60. As a result, the reciprocating stroke of the connecting/disconnecting sleeve 60 can be reduced. The reciprocating stroke can be reduced in the ball cam 106 of the latching mechanism 92, and the latching mechanism 92 can be made smaller in the dimension in the second rotation axis C2 direction. Therefore, the driving-force distributing device 30 can be made smaller in the dimension in the second rotation axis C2 direction.

According to the driving-force distributing device 30 of this example, the shaft insertion portion 36a and the cylindrical member 58 have the outer and inner diameters equal to each other, and the shaft insertion portion 36a and the cylindrical member 58 are lined up in the second rotation axis C2 direction and relatively non-rotatably coupled to each other by the tubular coupling member 62 having a smaller diameter than the outer diameter of the shaft insertion portion 36a and the cylindrical member 58 and fitted into the shaft insertion portion 36a and the cylindrical member 58. As a result, the radial dimension of the driving-force distributing device 30 is further reduced, which advantageously enhance the easiness of assembly.

According to the driving-force distributing device 30 of this example, the synchronizing mechanism 112 includes the friction engagement member 120 that has on the outer circumferential side the second tapered friction engagement surface 120a frictionally engageable with the first tapered friction engagement surface 56c formed on the inner circumferential surface of the ring gear 56 and that is spline-fitted movably in the second rotation axis C2 direction and relatively non-rotatably to the outer circumferential side of the cylindrical member 58 to move in the second rotation axis C2 direction together with the connecting/disconnecting sleeve 60, and the relative rotation between the inner-circumferential connecting/disconnecting teeth 56a and the outer-circumferential connecting/disconnecting teeth 60a is reduced through the frictional engagement between the first tapered friction engagement surface 56c and the second tapered friction engagement surface 120a at the second non-meshing position. As a result, since the relative rotation between the ring gear 56 and the connecting/disconnecting sleeve 60 is reduced before the meshing of the second connecting/disconnecting teeth 60a with the first connecting/disconnecting teeth 56a, gear noise and wear are preferably suppressed between the first connecting/disconnecting teeth 56a and the second connecting/disconnecting teeth 60a.

According to the rear-wheel driving-force distributing device 30 of this example, the second clutch (connecting/disconnecting mechanism) 32 includes the electromagnet (actuator) 94 and the latching mechanism 92, and the latching mechanism 92 includes the first cam (first piston) 100 reciprocated in the second rotation axis C2 direction in accordance with an on/off operation of the electromagnet 94, the second piston 98 disposed movably in the second rotation axis C2 direction on the outer circumferential side of the cylindrical member 58 and driven by the first cam (first piston) 100 in the second rotation axis C2 direction to press the friction engagement member 120 and the connecting/disconnecting sleeve 60, the second spring (spring) 108 urging the second piston 98 in the backward movement direction, and the holder 110 latching the second piston 98 against the urging force of the second spring 108 in accordance with reciprocation of the first cam 100 and unlatching the second piston 98 in accordance with reciprocation of the first cam 100 to allow the second piston 98 to move backward in accordance with the urging force of the second spring 108. As a result, it is only necessary to drive the electromagnet 94 for a relatively short time for moving the connecting/disconnecting sleeve 60 backward and forward, so that power consumption can be reduced.

Although the embodiment of the present invention has been described in detail with reference to the drawings, the present invention is also applicable to other forms.

For example, although the latching teeth 110a having one stage is formed on the holder 110 in the embodiment described above, latching teeth having two or more stages, i.e., latching teeth having multiple stages, may be formed.

In the embodiment described above, the rear-wheel driving-force distributing device 30 distributes the driving force transmitted from the engine 12 through the second differential device 36 to the rear wheels 16L, 16R in the four-wheel-drive state of the four-wheel-drive vehicle 10; however, for example, the configuration of the rear-wheel driving-force distributing device 30 may be applied to a front-wheel driving-force distributing device distributing the driving force transmitted from the engine 12 to the front wheels 14L, 14R in the four-wheel-drive state and the two-wheel-drive state of the four-wheel-drive vehicle 10.

Although the control clutch 96 of the embodiment described above includes the electromagnet 94 as the actuator, the actuator may be of another type made of a shape memory alloy, piezoelectric ceramics, etc.

The above description is merely an embodiment and the present invention can be implemented in variously modified and improved forms based on the knowledge of those skilled in the art.

REFERENCE SIGNS LIST

12: Engine (Drive power source)
16L, 16R: Rear wheels (Drive wheels)
30: Rear-wheel driving-force distributing device (Vehicle driving-force distributing device)
32: Second clutch (Connecting/disconnecting mechanism)
36: Second differential device (Differential device)
36a: Shaft insertion portion 36c: Differential case
36sa, 36sb: Differential gear
56: Ring gear
56a: Inner-circumferential connecting/disconnecting teeth (First connecting/disconnecting teeth)
56c: First tapered friction engagement surface
58: Cylindrical member
60: Connecting/disconnecting sleeve
60a: Outer-circumferential connecting/disconnecting teeth (Second connecting/disconnecting teeth)
60b: Inner-circumferential spline teeth
92: Latching mechanism
94: Electromagnet (Actuator)
98: Second piston
100: First cam (First piston)
102: Second cam
106: Ball cam
108: Second spring (Spring)
110: Holder
112: Synchronizing mechanism
120: First engagement member
120a: Second tapered friction engagement surface
C2: Second rotation axis (Rotation axis)

What is claimed is:

1. A vehicle driving-force distributing device including a ring gear disposed rotatably around a rotation axis and a differential device disposed rotatably around the rotation axis and including a differential case in which a pair of differential gears is assembled, the vehicle driving-force distributing device distributing a driving force transmitted from a drive power source to the ring gear through the differential device to left and right drive wheels, comprising:
   first connecting/disconnecting teeth disposed on the inner circumferential side of the ring gear;
   a connecting/disconnecting mechanism that includes a cylindrical member arranged concentrically with the differential gears and coupled relatively non-rotatably to a shaft insertion portion at one end portion of the differential case and a connecting/disconnecting sleeve including second connecting/disconnecting teeth on the outer circumferential side and spline-fitted movably in the rotation axis direction and relatively non-rotatably to the outer circumferential side of the shaft insertion portion and that connects and disconnects a power transmission path between the ring gear and the differential case by moving the connecting/disconnecting sleeve in the rotation axis direction between a meshing position at which the second connecting/disconnecting teeth are meshed with the first connecting/disconnecting teeth and a non-meshing position at which the second connecting/disconnecting teeth are not meshed with the first connecting/disconnecting teeth; and
   a synchronizing mechanism disposed between the ring gear and the cylindrical member and reducing a relative rotation between the first connecting/disconnecting teeth and the second connecting/disconnecting teeth, wherein:
   the connecting/disconnecting sleeve includes inner-circumferential spline teeth for spline fitting to the outer circumferential side of the shaft insertion portion,
   the pitch circle of the second connecting/disconnecting teeth disposed on the outer circumferential surface of the connecting/disconnecting sleeve has a larger diameter than the pitch circle of the inner-circumferential spline teeth, and
   the second connecting/disconnecting teeth disposed on the outer circumferential side of the connecting/disconnecting sleeve have a face width smaller than the face width of the inner-circumferential spline teeth.

2. The vehicle driving-force distributing device according to claim 1, wherein
   the shaft insertion portion and the cylindrical member have the outer and inner diameters equal to each other, and wherein the shaft insertion portion and the cylindrical member are lined up and coupled to each other by a tubular coupling member having a smaller diameter than the outer diameter of the shaft insertion portion and the cylindrical member and fitted into the shaft insertion portion and the cylindrical member.

3. The vehicle driving-force distributing device according to claim 1, wherein
   the synchronizing mechanism includes a friction engagement member that includes on the outer circumferential side a second tapered friction engagement surface selectively frictionally engaged with a first tapered friction engagement surface formed on the inner circumferential surface of the ring gear and that is spline-fitted movably in the rotation axis direction and relatively non-rotatably to the outer circumferential side of the cylindrical member to move in the rotation axis direction together with the connecting/disconnecting sleeve, and the synchronizing mechanism reduces a relative rotation between the first connecting/disconnecting teeth and the second connecting/disconnecting teeth through a frictional engagement between the first tapered friction engagement surface and the second tapered friction engagement surface at the non-meshing position.

4. The vehicle driving-force distributing device according to claim 2, wherein
   the synchronizing mechanism includes a friction engagement member that includes on the outer circumferential side a second tapered friction engagement surface selectively frictionally engaged with a first tapered friction engagement surface formed on the inner circumferential surface of the ring gear and that is spline-fitted movably in the rotation axis direction and relatively non-rotatably to the outer circumferential side of the cylindrical member to move in the rotation axis direction together with the connecting/disconnecting sleeve, and the synchronizing mechanism reduces a relative rotation between the first connecting/disconnecting teeth and the second connecting/disconnecting teeth through a frictional engagement between the first tapered friction engagement surface and the second tapered friction engagement surface at the non-meshing position.

5. The vehicle driving-force distributing device according to claim 3, wherein
   the connecting/disconnecting mechanism includes an actuator and a latching mechanism, and wherein the latching mechanism includes a first piston reciprocated in the rotation axis direction in accordance with an on/off operation of the actuator, a second piston disposed movably in the rotation axis direction on the outer circumferential side of the cylindrical member and driven by the first piston in the rotation axis direction to press the friction engagement member and the connecting/disconnecting sleeve, a spring urging the second piston in the backward movement direction, and a holder latching the second piston against the urging force of the spring in accordance with reciprocation of the first piston and unlatching the second piston in accordance with reciprocation of the first piston to allow the second piston to move backward in accordance with the urging force of the spring.

6. The vehicle driving-force distributing device according to claim 4, wherein
the connecting/disconnecting mechanism includes an actuator and a latching mechanism, and wherein the latching mechanism includes a first piston reciprocated in the rotation axis direction in accordance with an on/off operation of the actuator, a second piston disposed movably in the rotation axis direction on the outer circumferential side of the cylindrical member and driven by the first piston in the rotation axis direction to press the friction engagement member and the connecting/disconnecting sleeve, a spring urging the second piston in the backward movement direction, and a holder latching the second piston against the urging force of the spring in accordance with reciprocation of the first piston and unlatching the second piston in accordance with reciprocation of the first piston to allow the second piston to move backward in accordance with the urging force of the spring.

7. A vehicle driving-force distributing device including a ring gear disposed rotatably around a rotation axis and a differential device disposed rotatably around the rotation axis and including a differential case in which a pair of differential gears is assembled, the vehicle driving-force distributing device distributing a driving force transmitted from a drive power source to the ring gear through the differential device to left and right drive wheels, comprising:
first connecting/disconnecting teeth disposed on the inner circumferential side of the ring gear;
a connecting/disconnecting mechanism that includes a cylindrical member arranged concentrically with the differential gears and coupled relatively non-rotatably to a shaft insertion portion at one end portion of the differential case and a connecting/disconnecting sleeve including second connecting/disconnecting teeth on the outer circumferential side and spline-fitted movably in the rotation axis direction and relatively non-rotatably to the outer circumferential side of the shaft insertion portion and that connects and disconnects a power transmission path between the ring gear and the differential case by moving the connecting/disconnecting sleeve in the rotation axis direction between a meshing position at which the second connecting/disconnecting teeth are meshed with the first connecting/disconnecting teeth and a non-meshing position at which the second connecting/disconnecting teeth are not meshed with the first connecting/disconnecting teeth; and
a synchronizing mechanism disposed between the ring gear and the cylindrical member and reducing a relative rotation between the first connecting/disconnecting teeth and the second connecting/disconnecting teeth, wherein
the shaft insertion portion and the cylindrical member have the outer and inner diameters equal to each other, and wherein the shaft insertion portion and the cylindrical member are lined up and coupled to each other by a tubular coupling member having a smaller diameter than the outer diameter of the shaft insertion portion and the cylindrical member and fitted into the shaft insertion portion and the cylindrical member.

8. The vehicle driving-force distributing device according to claim 7, wherein
the synchronizing mechanism includes a friction engagement member that includes on the outer circumferential side a second tapered friction engagement surface selectively frictionally engaged with a first tapered friction engagement surface formed on the inner circumferential surface of the ring gear and that is spline-fitted movably in the rotation axis direction and relatively non-rotatably to the outer circumferential side of the cylindrical member to move in the rotation axis direction together with the connecting/disconnecting sleeve, and the synchronizing mechanism reduces a relative rotation between the first connecting/disconnecting teeth and the second connecting/disconnecting teeth through a frictional engagement between the first tapered friction engagement surface and the second tapered friction engagement surface at the non-meshing position.

9. The vehicle driving-force distributing device according to claim 8, wherein
the connecting/disconnecting mechanism includes an actuator and a latching mechanism, and wherein the latching mechanism includes a first piston reciprocated in the rotation axis direction in accordance with an on/off operation of the actuator, a second piston disposed movably in the rotation axis direction on the outer circumferential side of the cylindrical member and driven by the first piston in the rotation axis direction to press the friction engagement member and the connecting/disconnecting sleeve, a spring urging the second piston in the backward movement direction, and a holder latching the second piston against the urging force of the spring in accordance with reciprocation of the first piston and unlatching the second piston in accordance with reciprocation of the first piston to allow the second piston to move backward in accordance with the urging force of the spring.

10. A vehicle driving-force distributing device including a ring gear disposed rotatably around a rotation axis and a differential device disposed rotatably around the rotation axis and including a differential case in which a pair of differential gears is assembled, the vehicle driving-force distributing device distributing a driving force transmitted from a drive power source to the ring gear through the differential device to left and right drive wheels, comprising:
first connecting/disconnecting teeth disposed on the inner circumferential side of the ring gear;
a connecting/disconnecting mechanism that includes a cylindrical member arranged concentrically with the differential gears and coupled relatively non-rotatably to a shaft insertion portion at one end portion of the differential case and a connecting/disconnecting sleeve including second connecting/disconnecting teeth on the outer circumferential side and spline-fitted movably in the rotation axis direction and relatively non-rotatably to the outer circumferential side of the shaft insertion portion and that connects and disconnects a power transmission path between the ring gear and the differential case by moving the connecting/disconnecting sleeve in the rotation axis direction between a meshing position at which the second connecting/disconnecting teeth are meshed with the first connecting/disconnecting teeth and a non-meshing position at which the second connecting/disconnecting teeth are not meshed with the first connecting/disconnecting teeth; and
a synchronizing mechanism disposed between the ring gear and the cylindrical member and reducing a relative rotation between the first connecting/disconnecting teeth and the second connecting/disconnecting teeth, wherein:

the connecting/disconnecting sleeve includes inner-circumferential spline teeth for spline fitting to the outer circumferential side of the shaft insertion portion, the pitch circle of the second connecting/disconnecting teeth disposed on the outer circumferential surface of the connecting/disconnecting sleeve has a larger diameter than the pitch circle of the inner-circumferential spline teeth, the shaft insertion portion and the cylindrical member have the outer and inner diameters equal to each other, and the shaft insertion portion and the cylindrical member are lined up and coupled to each other by a tubular coupling member having a smaller diameter than the outer diameter of the shaft insertion portion and the cylindrical member and fitted into the shaft insertion portion and the cylindrical member.

11. The vehicle driving-force distributing device according to claim 10, wherein the synchronizing mechanism includes a friction engagement member that includes on the outer circumferential side a second tapered friction engagement surface selectively frictionally engaged with a first tapered friction engagement surface formed on the inner circumferential surface of the ring gear and that is spline-fitted movably in the rotation axis direction and relatively non-rotatably to the outer circumferential side of the cylindrical member to move in the rotation axis direction together with the connecting/disconnecting sleeve, and the synchronizing mechanism reduces a relative rotation between the first connecting/disconnecting teeth and the second connecting/disconnecting teeth through a frictional engagement between the first tapered friction engagement surface and the second tapered friction engagement surface at the non-meshing position.

12. The vehicle driving-force distributing device according to claim 11, wherein the connecting/disconnecting mechanism includes an actuator and a latching mechanism, and wherein the latching mechanism includes a first piston reciprocated in the rotation axis direction in accordance with an on/off operation of the actuator, a second piston disposed movably in the rotation axis direction on the outer circumferential side of the cylindrical member and driven by the first piston in the rotation axis direction to press the friction engagement member and the connecting/disconnecting sleeve, a spring urging the second piston in the backward movement direction, and a holder latching the second piston against the urging force of the spring in accordance with reciprocation of the first piston and unlatching the second piston in accordance with reciprocation of the first piston to allow the second piston to move backward in accordance with the urging force of the spring.

* * * * *